(12) United States Patent
Marshall et al.

(10) Patent No.: US 6,829,707 B1
(45) Date of Patent: Dec. 7, 2004

(54) METHOD AND SYSTEM FOR DOWNLOADING ENCRYPTED FONT SCRIPTS TO A PRINT SERVER

(75) Inventors: Keith Alan Marshall, Berthoud, CO (US); Arthur Ray Roberts, Boulder, CO (US); Mark Andrew Stephens, Westminster, CO (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/502,506

(22) Filed: Feb. 11, 2000

(51) Int. Cl.[7] .............................. G06K 9/18; G09C 1/04
(52) U.S. Cl. .................... 713/150; 358/1.11; 358/2.1
(58) Field of Search ............ 707/10–600; 713/115–205; 380/3–300; 358/1.11–2; 705/26, 27, 35; 715/500

(56) References Cited

U.S. PATENT DOCUMENTS

| | | |
|---|---|---|
| 5,289,580 A | 2/1994 | Latif et al. |
| 5,457,780 A | 10/1995 | Shaw et al. |
| 5,555,374 A | 9/1996 | Armerding et al. |
| 5,734,872 A | 3/1998 | Kelly |
| 5,754,748 A | 5/1998 | Rivers et al. |
| 5,790,790 A | 8/1998 | Smith et al. |
| 5,809,145 A | 9/1998 | Slik et al. |
| 5,828,905 A | 10/1998 | Rao |
| 6,012,071 A * | 1/2000 | Krishna et al. ............. 715/522 |
| 6,065,008 A * | 5/2000 | Simon et al. ................. 707/10 |
| 6,378,070 B1 * | 4/2002 | Chan et al. ................. 713/155 |
| 6,490,051 B1 * | 12/2002 | Nguyen et al. ............ 358/1.15 |

OTHER PUBLICATIONS

Digital Technical Journal, v. 3 #4, pp. 55–60: CPAP, Postscript based, supporting application via various Communication protocols. (Database Printout #18/9/20, Inspec p. 16).

* cited by examiner

Primary Examiner—Gregory Morse
Assistant Examiner—Ellen Tran
(74) Attorney, Agent, or Firm—Scott W. Reid; Dillon & Yudell, LLP

(57) ABSTRACT

A method and system for downloading encrypted double-byte font scripts to a print server. A communication element is interposed between a data processing system and a print server, where the print server does not support a bi-directional communication protocol utilized by the data processing system to download encrypted double-byte font scripts. The communication element supports data transmissions in both the bi-directional communication protocol and with the print server. To download a double-byte font script, the data processing system transmits a request to the print server through the communication element for an identifier from the print server. The print server transmits the identifier to the data processing system through the communication element. A decryption key for the double-byte font script is produced by the data processing system utilizing the identifier and downloaded with the encrypted double-byte font script to the print server through the communication element.

15 Claims, 3 Drawing Sheets

METHOD AND SYSTEM FOR DOWNLOADING ENCRYPTED FONT SCRIPTS TO A PRINT SERVER

BACKGROUND OF THE INVENTION

1. Technical Field

The present invention relates in general to an improved method and system for downloading fonts, and in particular to a method and system for downloading encrypted font scripts to a print server. Still more particularly, the present invention relates to a method and system for downloading encrypted double-byte font scripts from a data processing system that utilizes a bi-directional communications protocol to a print server which does not support the bi-directional communications protocol.

2. Description of the Related Art

In the development of printer systems, page-description languages have been developed which offer flexible font capability and high-quality graphics for printing. Currently, the most-well known of the page-description languages is POSTSCRIPT, which is a trademark of Adobe Systems. POSTSCRIPT fonts have been developed which are defined in terms of the POSTSCRIPT page-description language rules and are intended to be printed on a POSTSCRIPT-compatible printer.

POSTSCRIPT compatible printers typically utilize an ADOBE POSTSCRIPT Interpreter to support printing of POSTSCRIPT fonts. Typically, in order to print characters defined in POSTSCRIPT fonts, a script describing each character of the POSTSCRIPT font is downloaded to the POSTSCRIPT-compatible printer where the ADOBE POSTSCRIPT Interpreter utilizes the script to translate a printing image for each POSTSCRIPT character. The scripts for fonts may be loaded into a memory of the printer or in a print server that is dedicated to managing printers on a network. In this manner, the scripting is provided at the printer to support the font, for subsequent requests for the POSTSCRIPT font. Additionally, some PostScript fonts are encrypted and the printer must access the font script utilizing a decryption key downloaded with the encrypted font.

In the development of data processing systems, multiple operating systems (OSs) have been developed. In designing new operating systems, it is typical to provide support for existing operating systems by the new operating system. For example, the MACINTOSH (MAC) OS utilizes Printer Access Protocol (PAP) to govern communications between computers and printers where one function of PAP is downloading font scripts. MAC OS is a trademark of Apple Computers Corporation. WINDOWS NT is an example of an operating system that provides support for PAP communication whereby WINDOWS NT systems and MAC OS systems may communicate to download font scripts. WINDOWS NT is a trademark of Microsoft Corporation.

However, not all operating systems are enabled to support PAP. For example, the AIX OS does not support PAP communication with the MAC OS. AIX OS is a trademark of International Business Machines Corporation. However, the AIX OS may be utilized to control a print server. Therefore, from a MACINTOSH system, via traditional PAP communication, new font scripts cannot be downloaded to a print server controlled by the AIX OS.

In the development of POSTSCRIPT fonts, characters which require two bytes per character to specify have been created. To support downloading these double-byte character POSTSCRIPT fonts, a double-byte character POSTSCRIPT font downloader (DBFD) has been provided which is compatible with the MAC OS. In particular, the DBFD supports downloading encrypted double-byte character POSTSCRIPT fonts to a printer or print server. In a general example, the DBFD software resides on a data processing system controlled by the MAC OS. The DBFD works by sending a request, via a PAP connection, to a POSTSCRIPT interpreter on a print server or printer with a request for at least one unique POSTSCRIPT interpreter identifier(ID). The POSTSCRIPT interpreter processes the request from the MACINTOSH and responds, via a PAP connection, to the MACINTOSH with at least one unique interpreter ID. The DBFD then utilizes the returned unique interpreter ID(s) to make a key for decrypting an encrypted POSTSCRIPT double-byte font script. Thereafter, the encrypted POSTSCRIPT double-byte font script and a decryption key are transmitted to the printer or print server where the encrypted POSTSCRIPT double-byte font script and the decryption key are stored. When the font is successfully downloaded, the POSTSCRIPT interpreter of the printer or print server may utilize the newly stored font script to print documents.

In some markets, MAC OS based systems access printers which are served by AIX based systems. In this case, there is a need for a method for downloading double-byte character fonts scripts and other custom fonts from the MAC OS based systems to the print server which is an AIX based system. In particular, there is a need for a method of communicating between a MAC OS based system which supports the DBFD software and an AIX OS based system which supports the PostScript interpreter.

SUMMARY OF THE INVENTION

In view of the foregoing, it is therefore one object of the present invention to provide an improved method and system for downloading font scripts.

It is another object of the present invention to provide an improved method and system for downloading encrypted font scripts onto a print server.

It is yet another object of the present invention to 1provide an improved method and system for downloading encrypted double-byte font scripts from a data processing system that utilizes a bi-directional communications protocol to a print server which does not support the bi-directional communications protocol.

In accordance with the method and system of the present invention, a communication element is interposed between a data processing system and a print server, where the print server does not support a bi-directional communication protocol utilized by the data processing system to download encrypted double-byte font scripts. The communication element supports data transmissions in both the bi-directional communication protocol and with the print server. To download a double-byte font script, the data processing system transmits a request to the print server through the communication element for an identifier from the print server. The print server transmits the identifier to the data processing system through the communication element. A decryption key for the double-byte font script is produced by the data processing system utilizing the identifier and downloaded with the encrypted double-byte font script to the print server through the communication element.

All objects, features, and advantages of the present invention will become apparent in the following detailed written description.

DESCRIPTION OF THE FIGURES

The invention itself, as well as a preferred mode of use, further objects, and advantages thereof, will best be understood by reference to the following detailed description of an illustrative embodiment when read in conjunction with the accompanying drawings, wherein.

DESCRIPTION OF THE PREFERRED EMBODIMENT

Figure 1:
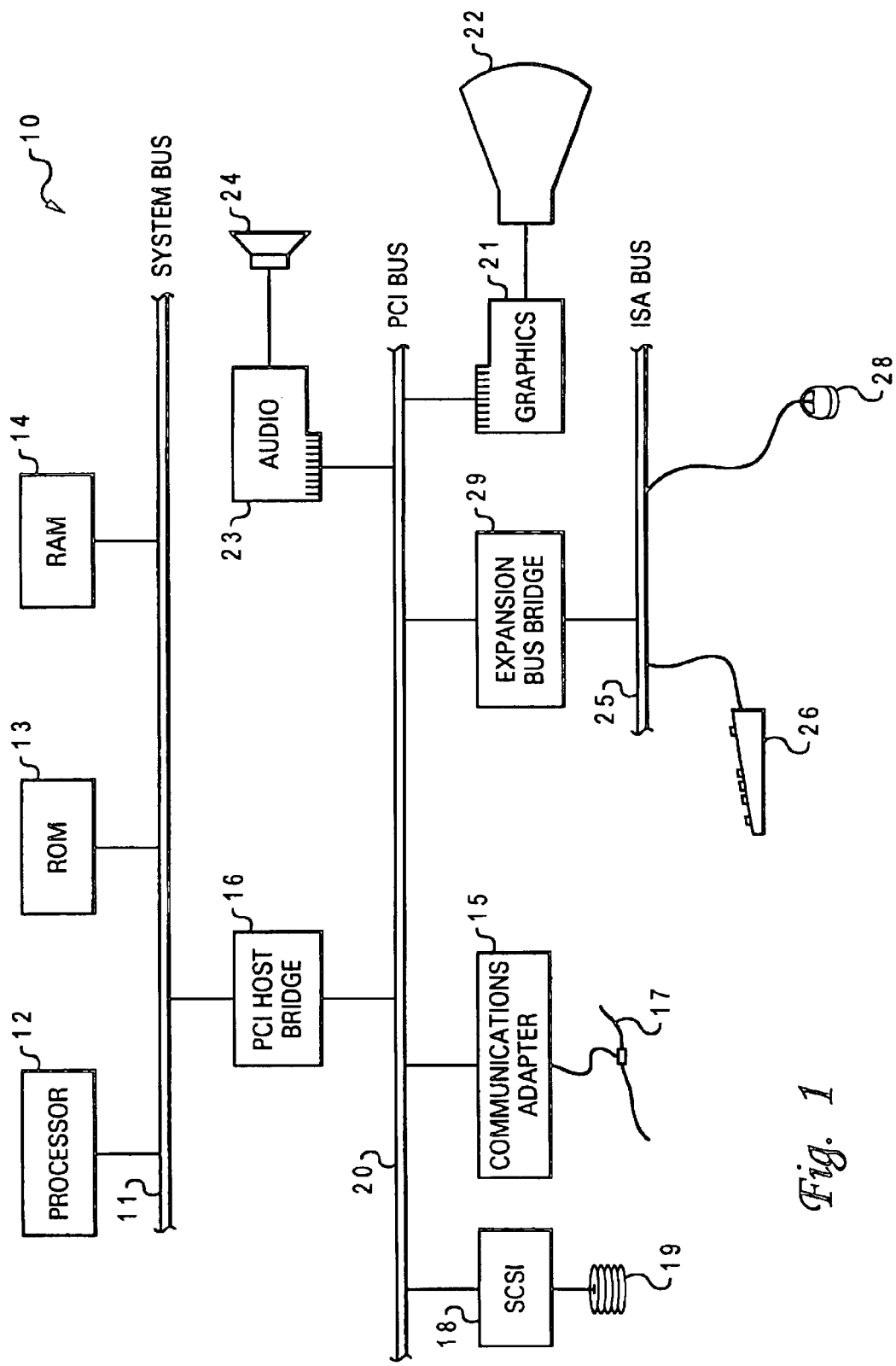
FIG. 1 depicts a block diagram of a typical computer system that may utilize a preferred embodiment of the present invention.

Referring now to the drawings and in particular to FIG. 1, there is depicted a block diagram of a typical computer system that may utilize a preferred embodiment of the present invention. As shown, a processor (CPU) 12, a read-only memory (ROM) 13, and a Random-Access Memory (RAM) 14 are connected to a system bus 11 of a computer system 10. CPU 12, ROM 13, and RAM 14 are also coupled to a PCI local bus 20 of computer system 10 through a PCI host bridge 16. PCI host bridge 16 provides a low latency path through which processor 12 may directly access PCI devices mapped anywhere within bus memory and/or I/O address spaces. PCI host bridge 16 also provides a high bandwidth path for allowing PCI devices to directly access RAM 14.

Also attaching to PCI local bus 20 are communications adapter 15, small computer system interface (SCSI) 18, and expansion bus bridge 29. Communications adapter 15 is utilized for connecting computer system 10 to a network 17. SCSI 18 is utilized to control high-speed SCSI disk drive 19. Expansion bus bridge 29, such as a PCI-to-ISA bus bridge, may be utilized for coupling ISA bus 25 to PCI local bus 20. As depicted, a keyboard 26 and a mouse 28 are attached to ISA bus 25 for performing certain basic I/O functions. In addition, an audio adapter 23 is attached to PCI local bus 20 for controlling audio output through speaker 24. A graphics adapter 21 is also attached to PCI local bus 20 for controlling visual output through display monitor 22. In alternate embodiments of the present invention, additional peripheral components may be added.

Computer system 10 also preferably includes an interface such as a graphical user interface (GUI) and an operating system (OS) that reside within machine readable media to direct the operation of computer system 10. Any suitable machine-readable media may retain the GUI and OS, such as RAM 14, ROM 13, SCSI disk drive 19, and other disk and/or tape drive (e.g. magnetic diskette, magnetic tape, CD-ROM, optical disk, or other suitable storage media). Any suitable GUI and OS may direct CPU 12. For example, the AIX operating system is one of IBM's operating systems which may be implemented.

Further, computer system 10 preferably includes at least one software application (e.g. program product) that resides within machine readable media and may be loaded into RAM 14 and then into CPU 12 for execution. A software application contains instructions that when executed on CPU 12 carry out the operations depicted in the flow chart of FIG. 4 and others described herein.

Figure 2:
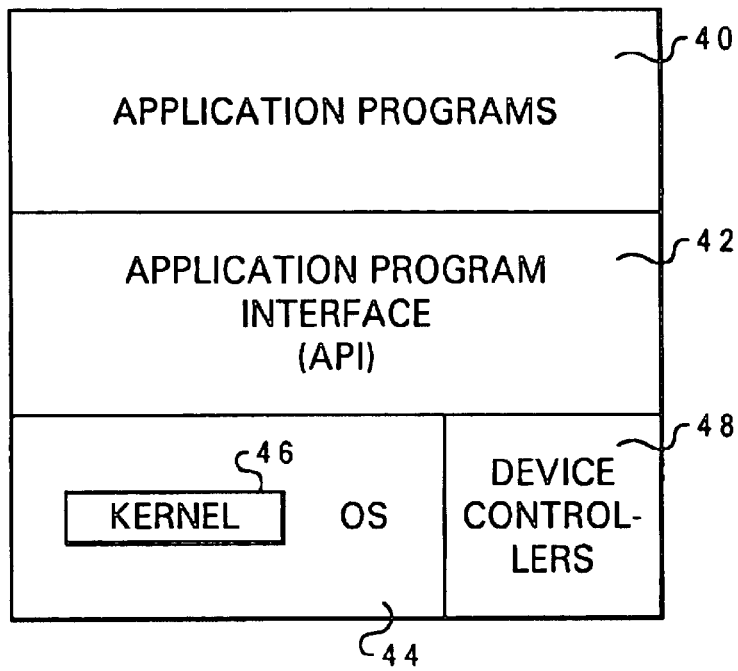
FIG. 2 illustrates a block diagram of a layer diagram of the software of the computer system of FIG. 1.

Referring now to FIG. 2, there is illustrated a block diagram of a layer diagram of the software of computer system 10. At the highest level of the diagram are the application programs 40. At the intermediate level is an application program interface (API) 42, through which the application programs request services from an operating system 44. The lowest level of each diagram is occupied by operating system 44. In addition to managing the operations of a computer system, operating system 44 also provides tools for managing communications between computer system 10 and remote data processing systems. Included in operating system 44 is a kernel 46 that manages the memory, files, and peripheral devices of computer system 10. The lowest level also includes device drivers 48 that each kernel utilizes to manage input from and output to peripheral devices.

Figure 3:
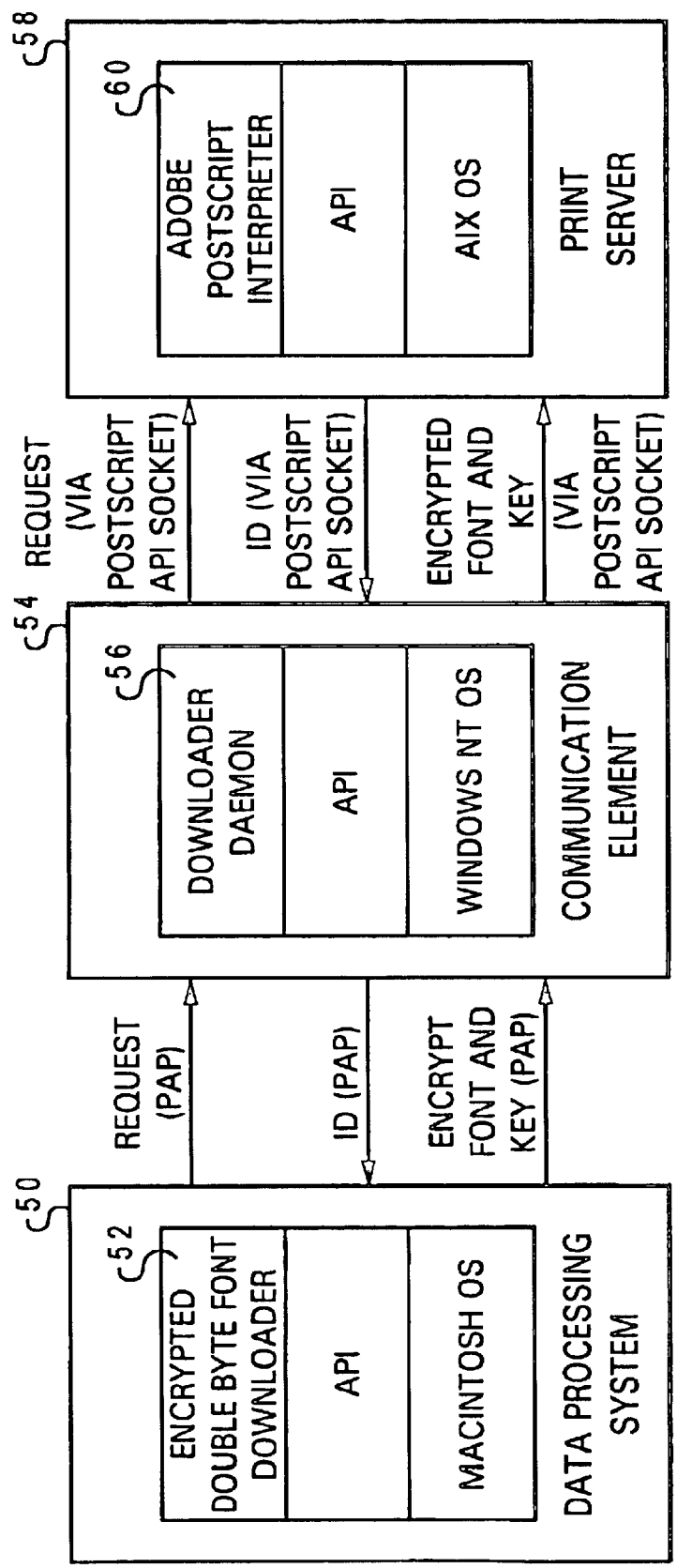
FIG. 3 depicts a block diagram of communications between a MAC OS based computer system and an AIX OS based computer system in accordance with the method and system of the present invention.

With reference now to FIG. 3, there is illustrated a block diagram of communications between a MAC OS based computer system and an AIX OS based computer system according to the method and system of the present invention. A MAC OS based data processing system 50 includes a double-byte font downloader (DBFD) application program 52. DBFD application program 52 produces a request for at least one unique printer interpreter ID in order to produce a decryption key that will be downloaded with encrypted double-byte POSTSCRIPT fonts to a print server. Data processing system 50 transmits the request via a printer access protocol (PAP) connection which is utilized by the MAC OS for communication with printers and or print servers. The request is received at a communications element 54 interposed between data processing system 50 and print server 58. In the present embodiment of the present invention, communication element 54 is supported by WINDOWS NT, includes a downloader daemon application program 56 and receives and transmits communications via at least one PAP connection and at least one POSTSCRIPT API socket. In alternate embodiments, communications element 54 may be supported by alternate operating systems, including alternate application programs and receive and transmit via alternate protocol interfaces.

Downloader daemon application program 56 routes the request to an AIX OS based print server 58 via a POSTSCRIPT API socket which provides for data transmission between communications element 54 and AIX OS based system. An ADOBE POSTSCRIPT Interpreter application program 60, residing on AIX OS based print server 58, receives the request and in turn produces at least one unique interpreter ID. At least one unique interpreter ID is passed to communication element 54 via the POSTSCRIPT API socket. Downloader daemon application program 56 routes at least one unique interpreter ID to data processing system 50 through the PAP connection. DBFD application program 52 produces a decryption key for an encrypted double-byte font script utilizing at least one unique interpreter ID. The encrypted POSTSCRIPT font and decryption key are transmitted to communication element 54 via the PAP connection. Downloader daemon application program 56 routes the encrypted POSTSCRIPT font and decryption key to print server 58 via the POSTSCRIPT API socket. Print server 58 stores the encrypted POSTSCRIPT font and decryption key for subsequent use.

Figure 4:
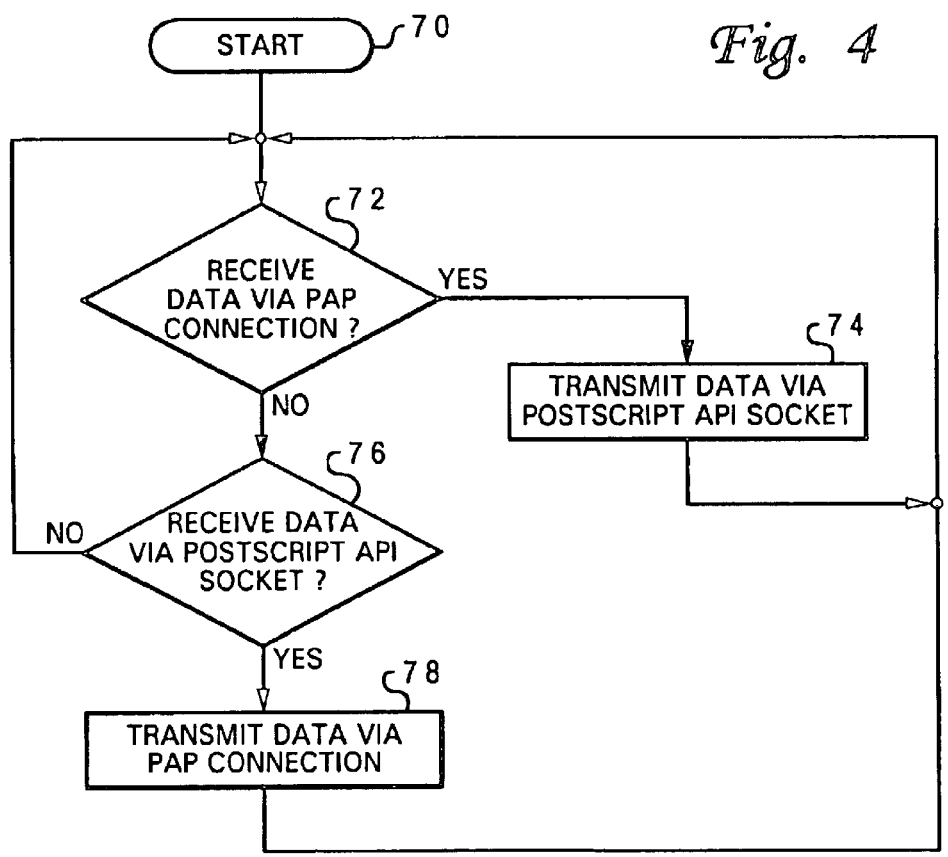
FIG. 4 illustrates high-level logic flowchart of a process for transmitting data to and from a PAP connection and a POSTSCRIPT API socket in accordance with the method and system of the present invention.

Referring now to FIG. 4, there is illustrated high-level logic flowchart of a process for transmitting data to and from a PAP connection and a POSTSCRIPT API socket in accordance with the present invention. As depicted, the process starts at block 70 and thereafter proceeds to block 72. Block 72 illustrates a determination as to whether or not there is data received via a PAP connection. If there is data received from a PAP connection, the process passes to block 74. Block 74 depicts transmitting the data received from the PAP connection to the intended destination through a POSTSCRIPT API socket. Thereafter, the process proceeds to block 72.

Returning to block 72, if there is not data received via a PAP connection, the process passes to block 76. Block 76 illustrates a determination as to whether data is received from a POSTSCRIPT API socket. If data is not received from a POSTSCRIPT API socket, the process passes to block 72. If the data is received from a POSTSCRIPT API socket, the process passes to block 78. Block 78 depicts transmitting the data received from the POSTSCRIPT API socket interface to the intended destination via a PAP connection. Thereafter, the process proceeds to block 72.

As has been described, the invention provides a method for downloading POSTSCRIPT fonts from a MAC OS based system to an AIX OS based system through a WINDOWS NT based system. Although the downloader daemon application program in the WINDOWS NT based system provides a communication method between the incompatible systems, other systems with operating systems that support both PAP and POSTSCRIPT API socket interface communication may be utilized. In addition, while the invention is described for a double-byte font downloader application program, other types of font downloader application programs may also be implemented by the method of the present invention.

This invention is described in a preferred embodiment in the following description with reference to the figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code on a network for remote execution. The method form of the invention may be practiced by combining one or more machine readable storage devices containing the code according to the present invention with appropriate standard computer hardware to execute the code contained therein. An apparatus for practicing the invention could be one or more computers and storage systems containing or having network access to computer program(s) coded in accordance with the invention.

While the invention has been particularly shown and described with reference to a preferred embodiment, it will be understood by those skilled in the art that various changes in form and detail may be made therein without departing from the spirit and scope of the invention.

What is claimed is:

1. A method for transmitting encrypted double-byte font scripts from a data processing system to a print server, said method comprising:

connecting a communication element between a data processing system and a print server that does not support a bi-directional communication protocol utilized by said data processing system, wherein said communication element is capable of communicating with said data processing system and with said print server;

in response to a request for an identifier from said print server by said data processing system, transmitting said request by said communication element to said print server;

in response to said identifier request from said communication element, transmitting an identifier by said print server through said communication element to said data processing system;

utilizing said identifier by said data processing system to generate a decryption key for an encrypted double-byte font script at said data processing system; and transmitting said encrypted double-byte font script and said decryption key from said data processing system through said communication element to said print server in which said encrypted double-byte font script is encrypted with said decryption key for printing documents at said print server.

2. The method of claim 1, wherein said data processing system operates under a Macintosh operating system and said print server operates under an AIX operating system.

3. The method of claim 1, wherein said data processing system is capable of supporting POSTSCRIPT page description language and said print server is incapable of supporting POSTSCRIPT page description language.

4. The method of claim 1, wherein said method further includes encrypting said encrypted double-byte font script via an interpreter within said print server.

5. The method of claim 1, wherein said method further includes storing said decryption key in said print server for decrypting said encrypted double-byte font script.

6. A computer program product for transmitting encrypted double-byte font scripts from a data processing system to a print server, said computer program product comprising:

program code means for connecting a communication element between a data processing system and a print server that does not support a bi-directional communication protocol utilized by said data processing system, wherein said communication element is capable of communicating with said data processing system and with said print server;

in response to a request for an identifier from said print server by said data processing system, program code means for transmitting said request by said communication element to said print server;

in response to said identifier request from said communication element, program code means for transmitting an identifier by said print server through said communication element to said data processing system;

program code means for utilizing said identifier by said data processing system to generate a decryption key for an encrypted double-byte font script at said data processing system; and program code means for transmitting said encrypted double-byte font script and said decryption key from said data processing system through said communication element to said print serve in which said encrypted double-byte font scrip is encrypted with said decryption key for printing documents at said print server.

7. The computer program product of claim 6, wherein said data processing system operates under a Macintosh operating system and said print server operates under an AIX operating system.

8. The computer program product of claim 6, wherein said data processing system is capable of supporting POSTSCRIPT page description language and said print server is incapable of supporting POSTSCRIPT page description language.

9. The computer program product of claim 6, wherein said computer program product further includes program code means for encrypting said encrypted double-byte font script via an interpreter within said print server.

10. The computer program product of claim 6, wherein said computer program product further includes program code means for storing said decryption key in said print server for decrypting said encrypted double-byte font script.

11. A system for transmitting encrypted double-byte font scripts from a data processing system to a print server, said system comprising:

means for connecting a communication element between a data processing system and a print server that does not support a bi-directional communication protocol utilized by said data processing system, wherein said communication element is capable of communicating with said data processing system and with said print server;

in response to a request for an identifier from said print server by said data processing system, means for transmitting said request by said communication element to said print server;

in response to said identifier request from said communication element, means for transmitting an identifier by said print server through said communication element to said data processing system;

means for utilizing said identifier by said data processing system to generate a decryption key for an encrypted double-byte font script at said data processing system; and means for transmitting said encrypted double-byte font script and said decryption key from said data processing system through said communication element to said print serve in which said encrypted double-byte font scrip is encrypted with said decryption key for printing documents at said print server.

12. The system of claim 11, wherein said data processing system operates under a Macintosh operating system and said print server operates under an AIX operating system.

13. The system of claim 11, wherein said data processing system is capable of supporting POSTSCRIPT page description language and said print server is incapable of supporting POSTSCRIPT page description language.

14. The system of claim 11, wherein said system further includes means for encrypting said encrypted double-byte font script via an interpreter within said print server.

15. The system of claim 11, wherein said system further includes means for storing said decryption key in said print server for decrypting said encrypted double-byte font script.

* * * * *